United States Patent [19]

Sakamoto

[11] Patent Number: 4,890,810
[45] Date of Patent: Jan. 2, 1990

[54] SEAT SUSPENSION DEVICE

[75] Inventor: Takao Sakamoto, Akishaima, Japan

[73] Assignee: Tachi-S Co., Ltd., Tokyo, Japan

[21] Appl. No.: 181,689

[22] Filed: Apr. 14, 1988

[51] Int. Cl.$^4$ ............................................. F16M 13/00
[52] U.S. Cl. .................................... 248/588; 248/608;
  248/575; 297/301; 297/307; 267/154
[58] Field of Search ............... 248/588, 608, 590, 584,
  248/564, 587, 595, 164, 157, 173, 567, 575, 277;
  297/301, 307, 345; 108/136; 267/154, 277, 278

[56] References Cited

U.S. PATENT DOCUMENTS

| | | | |
|---|---|---|---|
| 3,140,851 | 7/1964 | Bilancia | 248/588 |
| 3,813,073 | 5/1974 | Mohr et al. | 248/608 |
| 3,823,932 | 7/1974 | Simons | 248/575 X |
| 4,067,610 | 1/1978 | Doerr et al. | 297/301 |
| 4,394,046 | 7/1983 | Irwin et al. | 297/345 X |
| 4,640,488 | 2/1987 | Sakamoto | 248/564 X |
| 4,729,539 | 3/1988 | Nagata | 248/588 X |

FOREIGN PATENT DOCUMENTS 2068078 8/1981 United Kingdom ............... 248/590

Primary Examiner—Reinaldo P. Machado
Assistant Examiner—Karen J. Chotkowski
Attorney, Agent, or Firm—Browdy and Neimark

[57] ABSTRACT

A seat suspension device which comprises an upper frame, a lower frame, a pair of linkage mechanisms provided between the upper and lower frames, and a torsion bar which elastically supports the seat upon the suspension device. The torsion bar is so arranged that it extends along the lateral bar section of one of the upper and lower frames, with its support end portion being secured at the other of the upper and lower frames, so as to resiliently support the upper frame. Further, the linkage mechanisms have downwardly arced upper portions in each of their links. Thus, these structures permit the lowering of the upper frame or the seat down to a lowest possible degree without interference of the parts of the linkage mechanisms and torsion bar.

6 Claims, 2 Drawing Sheets

SEAT SUSPENSION DEVICE

BACKGROUND OF THE INVENTION

1. Field of the Invention

The present invention relates to a seat suspension device for use in an automotive seat.

2. Description of the Prior Art

In general, jolting or rolling experienced during driving an automobile on a rough road is reduced by use of a seat suspension device which is installed beneath the seat for resiliently bearing the same.

A typical example of conventional seat suspension device of this kind is shown in FIG. 1 of the accompanying drawings, wherein the device as a whole is generally designated by (1), which has a lower frame (2) fixed to the floor (not shown) of an automobile, and an upper frame (3) bearing a seat cushion frame (not shown) to which an automotive seat is mounted.

As shown, a pair of X-shaped links (5)(5') are provided between the lower and upper frames (2)(3) to permit vertical movement of the upper frame (3) relative to the lower one (2). Each of the X-shaped links (5)(5') is composed of two links (6)(7) crossed at a pivot point (8) in a manner rotatable thereabout, such that the first link (6) is at its lower end fixed to a lower fixed spindle (9) rotatably supported on the lower frame (2) and at its upper end connected to an upper movable spindle (10) which is provided with a pair of rollers (10a) for allowing the upper end of the link (6) to move in the longitundinal direction of the lateral bar sections of the upper frame (3), whereas the second link (7) is at its upper end rotatably connected to an upper fixed spindle (11) journalled at the upper frame (3) and at its lower end connected to a lower movable spindle (12) which is also provided with a pair of rollers (12a) for movements of the lower end of the link (7) in a same direction as in the upper end of the first link (6). A torsion bar (13) is arranged centrally of the thus-constructed X-shaped links (5)(5'), passing through the pivot portions (8), with its one terminal portion (13a) being curved and secured at the first link (6) of the X-shaped link (5) in a direction opposite the other terminal portion (13a') which is secured via an adjustment mechanism (15) at the upper part of the second link (7) of the opposed X-shaped link (5).

According to this prior art, when a downward load is applied to the seat suspension device (1), the X-shaped links (5) are lowered, causing both terminal portions (13a)(13a') of the torsion bar (13) to move away from each other, whereby the torsion bar (13) produces an elastic repercussive force via its terminal portions (13a)(13a') against the lowering of the X-shaped links (5) so as to absorb a jolt or vibration of the automobile.

However, such structure of the prior art suspension device is not adaptable for use in a small automobile with limited space and a truck whose floor is generally higher, in that the torsion bar (13) extends transversely and centrally of the suspension device (1), which is a limit against the bottom line of a cushion body laying centrally of the device (1). This means that the bottom line of the cushion body can not be further lowered into the central portion of the suspension device (1), as a result of which the buttocks position of an occupant sitting on the seat is not lowered to a lowest possible level, and therefore it is impossible to design a seat of low seating level that is suitable for use in the small automobile or truck.

SUMMARY OF THE INVENTION

In order to eliminate the above-stated drawback, it is a purpose of the present invention to provide an improved seat suspension device which allows for receiving a seat cushion body therein so that the bottom of the seat cushion body may be lowered at a lowest possible degree.

In achieving this purpose, the present invention comprises a seat suspension device of such linkage type wherein an upper frame bearing a seat is movable vertically relative to a lower frame fixed on the floor of an automobile via a pair of link mechanisms interposed between the upper and lower frames, and a torsion bar arranged on the lower frame such that it extends along the longitudinal direction of the lateral bar section of the lower frame, with its base end portion being secured on the lower frame side and its support end portion being disposed externally of the link mechanisms and secured at the upper frame side, whereby the upper frame is resiliently supported in a manner movable vertically relative to the lower frame.

Accordingly, when an occupant sits on the seat, the link mechanisms and the upper frame are lowered due to his or her weight, while simultaneously the upper frame is applied an elastic repercussive force from the torsion bar which is twisted by the lowering upper frame, and supported resiliently thereby, and it will be appeciated that since the torsion bar is arranged laterally of the device, the bottom of the seat cushion body is lowered through the center of the seat suspension device without interference of the torsion bar, whereupon the buttocks position of the occupant can be lowered at a desired low level or down to a lowest possible degree towards the floor of the automobile.

DETAILED DESCRIPTION OF PREFERRED EMBODIMENT OF THE INVENTION

Figure 4:
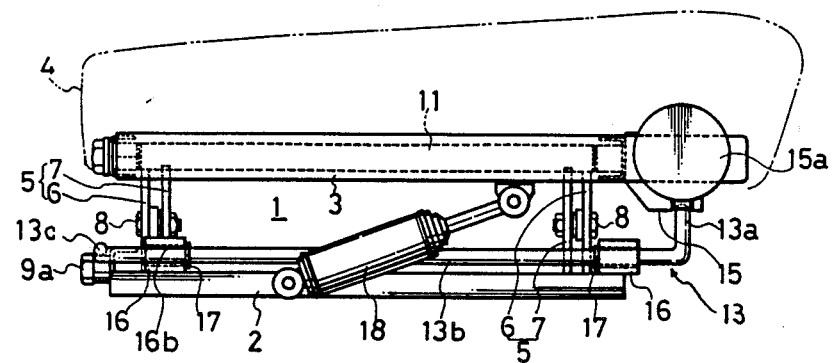
FIG. 4 is a side view of the same device as in FIG. 2.

With reference to FIGS. 2-5, one preferred embodiment of the present invention will be described hereinafter.

At first, in this embodiment, many of the reference numerals and characters used in the above-stated description of the prior art will be used, in view of a similar structure of seat suspension device to the prior art one, and as such all like reference numerals and characters in the former correspond to all like ones that will be indicated hereinafter, so that the specific description is eliminated thereof.

A seat suspension device (1) comprises an upper frame (3), lower frame (2), and a pair of X-shaped links (5)(5') interposed between the upper and lower frames (3)(2) such that the upper frame (3) is movable vertically relative to the lower frame (2) in a manner similar to the conventional device (1) as stated above.

It should be noted here that the upper frame (3) in the present embodiment also constitutes a seat cushion frame associated with a seat cushion body (4). This is intended to provide a single frame between the seat suspension device (1) and the seat cushion body (4) with a view to reducing the height of the seat cushion body (4) with respect to the floor of the automobile (not shown).

With respect to a pair of the X-shaped links (5)(5'), a description will be given mainly of the X-shaped link (5). Link (5) comprises a first link member (6) and second link member (7) such that the crossing point or pivot portion (8) of those two link members (6)(7) is located lower; in other words, the first and second link members (6)(7) respectively have upper long arcuate sections (6a)(7a) that extend upwardly away from each other at the pivot portion (8), and further respectively have lower short rectilinear sections (7a)(7b) that extend downwardly away from each other at the pivot portion (8), with the former sections (6a)(7a) being longer than the latter sections (6b)(7b), respectively.

The upper long arcuate sections (6a)(7a) are at their respective lower edges formed with semicircular cutaway portions (6a1)(7a1) which are so disposed as to be engagable with the upper surface of a lower movable spindle (12) and that of a lower fixed spindle (9), respectively. The lower movable and lower fixed spindles (12)(9) are provided on the lower frame (2), and also provided on the lower frame (2) are the lower ends of the first and second link members (6)(7), in the same manner as in the above-stated prior art.

The other opposite X-shaped link (5') is constructed in a similar way to the above-mentioned X-shaped link (5) with its members or elements designated by numerals or characters with dashes being formed and assembled in the same manner with those of the X-shaped link (5), and so, specific description thereof is omitted.

Figure 2:
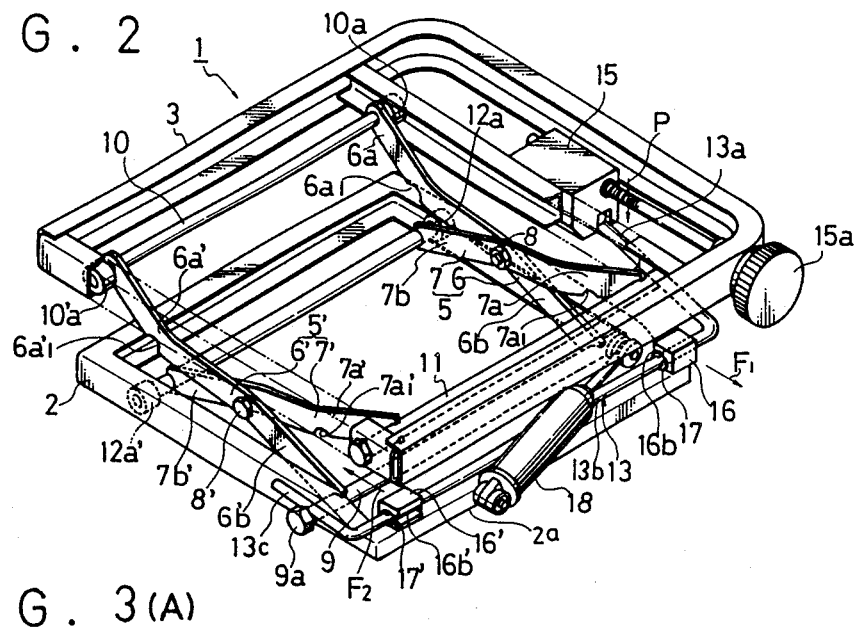
FIG. 2 is a perspective view of a seat suspension device in accordance with the present invention, as viewed from the rear side thereof.

On the lower frame (2), a torsion bar (13) is mounted such that it extends along the lateral bar section of the lower frame (2), which comprises a support end portion (13a), an intermediate portion (13b) and a base end portion (13c) in an integral manner. As best seen in FIG. 2, those three integral portions of the torsion bar (13) are of such structure that the support end portion (13a) is bent externally of the lower frame (2) at a substantially right angle relative to the intermediate portion (13b) in a sense to direct inwardly of the lower frame (2) and further twisted in an upwardly inclined manner from the intermediate portion (13b). This particular intermediate portion (13b) is secured on the upper surface of the lateral bar section (2a) of the lower frame in a manner to be explained later, extending along the longitudinal direction of that lateral bar section (2a), and the base end portion (13c) is bent at a substantially right angle relative to the intermediate portion (13b), extending horizontally therefrom in a direction inwardly of the lower frame (2). The support end portion (13a) is secured at the side of the upper frame (3) in such a manner as to be disposed externally of the X-shaped link (5) through a torsion force adjustment mechanism (15) provided on the lateral surface of the upper frame (3) adjustment mechanism (15) will be described later. On the other hand, the base end portion (13c) is secured by a bolt-like headed extension (9a) of the fixed spindle (9) which is projected at the rearward portion of the lower frame (2).

It therefore can be seen that the torsion bar (13) thus constructed, resiliently urges, at its support end portion (13), the upper frame (3) in an upward direction away from the lower frame (2), thereby offering a cushiony effect to the upper frame (3) and thus to the seat cushion body (4), and the torsion bar (13) as a whole is positioned distant from the X-shaped links (5)(5') so as to avoid the interference of the former with the latter.

Figure 5:
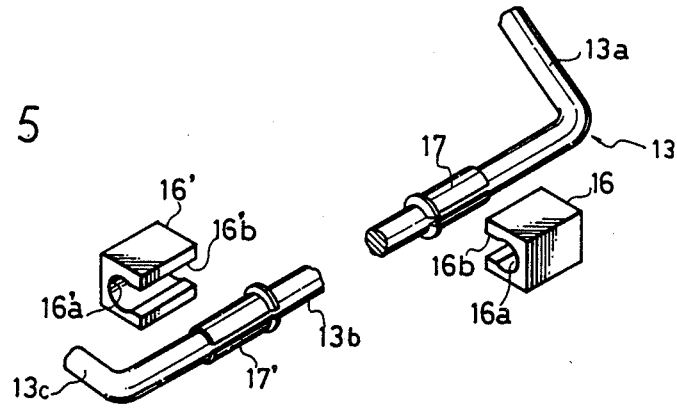
FIG. 5 is a partially broken view of a torsion bar and support members thereof in accordance with the present invention.
Figure 1:
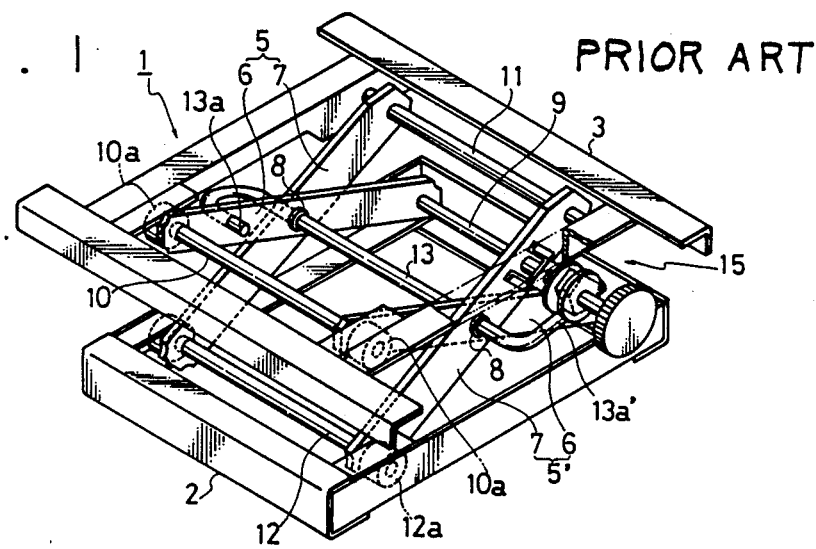
FIG. 1 is a perspective view of a conventional seat suspension device.

As shown in FIG. 5, the torsion bar (13) is secured by means of a pair of spaced retaining members (16)(16') which are fixed on the upper surface of the aforementioned lateral bar section (2a) of the lower frame (2) such that the torsion bar (13) is rotatable via a pair of spilt bushes (17)(17') within the retaining members (16)(16'). Specifically, the two retaining members (16)(16') are respectively formed with circular bores (16a)(16a') each having an inner diameter generally equal to the respective outer diameters of the two spilt bushes (17)(17') firmly encircling the outer surface of the intermediate portion (13b) of the torsion bar (13), and are further respectively formed with opened portions (16a)(16a') which extend along the longitudinal direction of the respective circular bores (16a)(16a'), establishing opened communication with those bores (16a)(16a'), whereupon each of the retaining members (16)(16') assumes a substantially ⊐ shaped configuration in section. The thus-formed retaining members (16)(16') are arranged such that the opened portions (16a)(16a') thereof face in a direction opposite to each other in order to resist a component force generated from a load (P) applied to the support end portion (3a) of the torsion bar (13). Specifically, the first retaining member (16) receiving the intermediate portion (13b) adjacent to the support end portion (13a) is so arranged that its opened portion (16a) faces inwardly of the lower frame (2) to thereby resist an outwardly exerted component force (F1) generated through the torsion bar (13) from the load (P) in a direction outwardly of the lower frame (2). In contrast, as to the second retaining member (16') receiving the intermediate portion (13b) adjacent to the base end portion (13c), its opened portion (16a') faces outwardly of the lower frame (2) to thereby resist an inwardly exerted component force (F2) which is further produced through the torsion bar (13) due to the resistance of the first retaining member (16) in a direction inwardly of the lower frame (2). (See FIG. 1)

The foregoing two split bushes (17)(17') are spaced from each other on the intermediate portion (13b) at a distance equal to that of the two spaced retaining members (16)(16').

Securing the intermediate portion (13b) of the torsion bar (13) on the lower frame (2) is effected by inserting the same at its two spaced split bushes (17)(17') into the opened portions (16b)(16b') of the retaining members (16)(16') and then snap fitting it in the bores (16a)(16a') thereof, respectively.

The torsion force adjustment mechanism (15) to which the support end portion (13a) of the torsion bar (13) is operatively connected is a conventional one that has been commonly used in this particular field, and no specific description thereon is included. But, for the sake of understanding, the basic construction of the adjustment mechanism (15) is such that there is provided an operation knob (15a) and a cam member (15b)

having plural discrete cam surfaces, which is rotated by operation of the knob (15a) to provide varied heights of the cam surface. Against one of those plural cam surfaces of the cam member (15b), is abutted the support end portion (13a) of the torsion bar (13). By operation of the knob (15), the cam member (15b) is caused to rotate, changing its cam surface to another different one, whereby such variation of cam surface height causes the corresponding variation of torsion angle of the support end portion (13a), thus enabling adjustment in the elastic repercussive force of the torsion bar (13) against the upper frame (3).

Between the upper and lower frames (3)(2), a shock absorber (18) is obliquely provided for the purpose of absorbing a sudden great load such that its upper end is pivotally fixed on the rear surface of the upper frame (3) and its lower end is pivotally fixed on the latteral surface of the lower frame (2).

With the present invention constructed as above, the upper frame (3), when a downward load is applied, in case of an occupant sitting on the seat thereon, is lowered towards the lower frame (2), with the lowering of the X-shaped links (5)(5'), which causes the twistingly rotation of the support end portion (13a) of the torsion bar (13) in a downward direction in relation to the intermediate portion (13a) thereof, with the result that the torsion bar (13) creates an elastic repersussive force at its support end portion (13a) so sufficiently as to support the upper frame (3) resiliently at a given level determined by the torsion adjustment mechanism (15).

Further, in accordance with the present invention, the torsion bar (13) is provided along one lateral bar section (2a) of the upper frame (2) with its support end portion (13a) disposed externally of the X-shaped link (5), and the shock absorber (18) is so arranged that it is disposed externally of the seat suspension device (1), and therefore, the bottom of the seat cushion body (4), when lowered down, is not contacted with those torsion bar (13) and shock absorber (18).

Still further, in the present invention, the downwardly arced shape of the upper arcuate sections (6a)(6a')(7a)(7a') of the X-shaped links (5)(5') is advantageous in that, when the X-shaped links (5)(5') are lowered, the upper arcuate sections (6a)(6a') (7a)(7a') thereof are displaced outwardly at a far distance as compared with merely rectilinearly formed link members of the previously stated prior-art X-shaped links, to thereby ensure preventing those sections (6a)(6a')-(7a)(7a') from contact with the bottom portion of the seat cushion body (4) being lowered. Accordingly, there is no possibility of the seat cushion body (4) being contacted with the X-shaped links (5)(5').

Figure 3A:
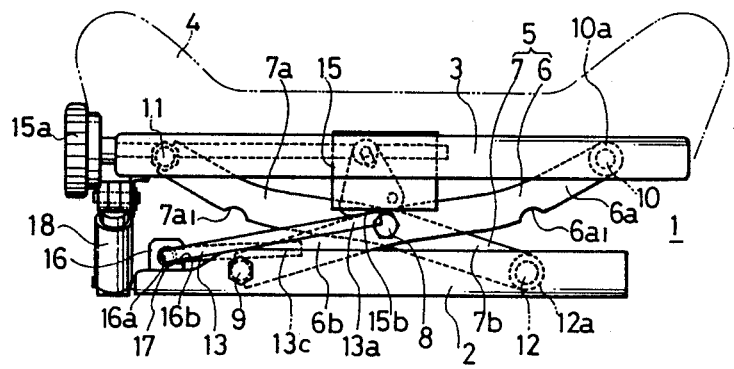
FIG. 3(A) is a front view of the same device as in FIG. 2.
Figure 3B:
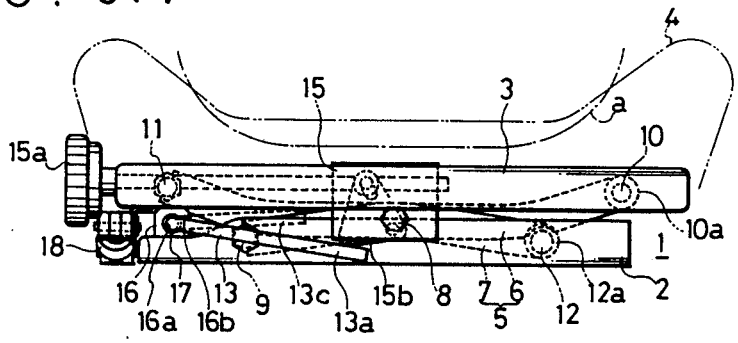
FIG. 3(B) is a front view of the same device as in FIG. 3(A), which shows the state in which an upper frame is lowered towards a lower frame.

Thus, it will be appreciated that the seat cushion body (4) on the above-described suspension device (1) can be lowered down to a lowest possible degree without any obstruction of surrounding elements of the suspension device (1) as such, in conjunction with the simple provision of the upper frame (3) between the seat cushion body (4) and the X-shaped links (5)(5'), it is readily possible that the buttocks position (a) of an occupant on the seat cushion body (4) can be lowered to a lowest possible level, as seen in FIG. 3(B). Moreover, the provision of the semi-circular cut-away portions (6a1)-(7a1)(6a1') (7a1') in the X-shaped links (5)(5') allows further lowering of the seat cushion body (4) as well as the buttocks position (a) of the occupant thereon, by the reason of the fact that when those cut-away portions (6a1)(7a1)(6a1')(7a1') are nearly engaged with the lower fixed and lower movable spindles (9) (12), respectively, as in FIG. 3(B), the X-shaped links (5)(5') are further lowered to a degree substantially corresponding to the depth of the cutaway portions (6a1)(7a1)(6a1')-(7a1'). Accordingly, the seat suspension device (1) in accordance with the present invention can readily be installed in a small automobile with limited interior space or in a truck having a relatively high floor.

Another advantage of the present invention is that the torsion bar (13) is secured on the lower frame (2) simply by the two retaining members (16)(16') of which opened portions (16b)(16b') receiving the torsion bar (13) are directed opposite to each other, which expedites the mounting of the torsion bar (13) to the lower frame (2) with far more ease.

In addition, the fact that the torsion bar (13) is directly connected with the upper and lower frames (3)(2) at its support end portion (13a) and base end portion (13c), respectively, not through the X-shaped links (5)(5'), serves to avoid the hard frictional contact of the torsion bar (13) with the parts of the X-shaped links (5)(5'), thus resulting in a much more increased length of use life of the torsion bar (13).

While in the above-described embodiment the torsion bar (13) is mounted on the lower frame (2) with its support end portion (13a) being secured at the upper frame (2), it may be arranged, reversely, that the torsion bar (13) is mounted on the upper frame (3) with its support end portion (13a) being secured at the lower frame (2).

Also, while in the embodiment the X-shaped links (5)(5') are used, yet another kinds of linkage mechanisms such a parallel linkage structure may be provided for vertical movements of the seat suspension device (1).

Finally, it should be understood that the present invention is not limited to the illustrated embodiments but other replacements, modifications, and additions may structurally be possible without departing from the spirit and scope of the appended claims for the invention.

What is claimed is:

1. A seat suspension device comprising:
an upper frame to be fixed at the seat;
a lower frame to be fixed on a floor;
a pair of linkage mechanisms provided between said upper and lower frames so as to permit vertical movement of said upper frame relative to said lower frame, wherein said pair of linkage mechanisms comprises a pair of X-shaped links so constructed that a pair of first link members are rotatably pivotally fixed with a pair of second link members in a crossed manner, said pair of first link members being rotatably connected at respective upper ends thereof to an upper movable spindle provided movably within said upper frame and rotatably connected at respective lower ends thereof to alower fixed spindle provided within said lower frame, said pair of second link members being rotatably connected at respective lower ends thereof to a lower movable spindle provided movably within said lower frame and rotatably connected at respective upper ends thereof to an upper fixed spindle provided within said upper frame, and upper portions of said first and second link members respectively being formed long in a downwardly arced shape with respect to the respective lower portions thereof so that respective pivot points of said pair of X-shaped links are located low relative to a central point of said pair of X-shaped links; and a torsion bar including a support end portion and a base end portion, said torsion bar having a lateral portion along which said torsion bar is secured on one of said upper frame and lower frame, said base end portion of said torsion bar being secured at the other of said upper and lower frames and said support end portion thereof being secured at said one of said upper and lower frames, whereby said upper frame is resiliently supported by said torsion bar with respect to the lower frame.

2. The seat suspension device according to claim 1, wherein said upper frame forms a cushion frame of said seat.

3. The seat suspension device according to claim 1, wherein said upper portions respectively of said first and second link members are each formed at a lower edge thereof a with semicircular cut-away portion so as to be engagable with the respective said lower movable and fixed spindles.

4. The seat suspension device according to claim 1, wherein said torsion bar is secured on a lateral bar section of said lower frame, wherein said support end portion of said torsion bar is bent at a substantially right angle and further twisted in an upwardly inclined manner, and said base end portion of said torsion bar is secured at said lower frame, and wherein said support end portion is abutted against a torsion force adjustment mechanism provided at said upper frame.

5. The seat suspension device according to claim 1, further comprising a pair of retaining members fixed on said lower frame, said pair of retaining members each having an opened portion at one side surface thereof and thus being of a substantially ⊐ shaped configuration in section, wherein said pair of retaining members are so arranged that opened portions thereof face in directions opposite to each other, and wherein said torsion bar is rotatably fitted in said pair of retaining members through the respective said opened portions and secured thereby on said lower frame.

6. The seat suspension device according to claim 1, wherein a shock absorber is provided between said upper and lower frames such that the shock absorber is disposed externally of said upper and lower frames.

* * * * *